United States Patent [19]

Matsumoto

[11] 4,159,246

[45] Jun. 26, 1979

[54] REMOVAL OF FLUORINE FROM WATER

[75] Inventor: Mitsuo Matsumoto, Suita, Japan

[73] Assignee: Kohei Deguchi, Japan

[21] Appl. No.: 861,511

[22] Filed: Dec. 16, 1977

Related U.S. Application Data

[63] Continuation of Ser. No. 717,903, Aug. 26, 1976, abandoned.

[30] Foreign Application Priority Data

| Sep. 10, 1975 | [JP] | Japan | 50-110174 |
| Sep. 17, 1975 | [JP] | Japan | 50-113058 |
| Dec. 6, 1975 | [JP] | Japan | 50-146151 |

[51] Int. Cl.$^2$ .................... B01D 21/01; C02B 1/20
[52] U.S. Cl. .................... 210/47; 210/52; 210/DIG. 32; 204/149
[58] Field of Search ........... 204/149; 210/28, 42 R, 210/47, 51–53, 192, 49, DIG. 32

[56] References Cited

U.S. PATENT DOCUMENTS

| 937,210 | 10/1909 | Harris | 204/149 |
| 2,043,705 | 6/1936 | Meinzer | 210/28 |
| 2,531,451 | 11/1950 | Maier | 210/28 |
| 3,101,317 | 8/1963 | Starry | 210/52 |
| 3,926,753 | 12/1975 | Lee | 204/149 |

FOREIGN PATENT DOCUMENTS

| 4738110 | 2/1968 | Japan | 210/47 |
| 261996 | 5/1970 | U.S.S.R. | 210/42 R |

*Primary Examiner*—Charles N. Hart
*Assistant Examiner*—Peter A. Hruskoci
*Attorney, Agent, or Firm*—Eyre, Mann, Lucas & Just

[57] ABSTRACT

The invention provides a method for removing fluorine from water by causing aluminium ions ionized in the water to combine with fluorine ions to produce an insoluble aluminium fluorides, which can be readily eliminated from the water.

3 Claims, 4 Drawing Figures

REMOVAL OF FLUORINE FROM WATER

This is a continuation of application Ser. No. 717,903, filed Aug. 26, 1976 now abandoned.

The present invention relates to a method of removing fluorine from water, thereby adapting same to a drinkable water.

A common practice to remove fluorine content from a waste water is to use calcium to produce an insoluble calcium fluorides normally settling down as deposits. However, under this method it is found that the remaining water still has 15 to 50 ppm of fluorine, which is a dangerous level for letting the water into a river under the consideration of public hazard. Accordingly, for a more effective method many proposals have been made, among which is one methode employing an activated alumina as an adsorber, and the other is a method using aluminium sulfate as an aggregate agent. But these methods require labour and skill in regenerating the used agents, and additionally they have a difficulty in controlling the amount of those agents. This prevents them from being widely applied.

It is commonly accepted that a fluorine content in water will not constitute a health hazard, and it is rather known as preventive for a decayed tooth. However, if the fluorine content exceeds 0.5 ppm, it is in danger of damaging the enamel of a teeth. If it exceeds 0.8 ppm it will be no longer fit for a drinking water. Therefore, to make water drinkable the fluorine content must be kept below 0.8 ppm, and more preferably, below 0.5 ppm.

In general, however, a river water contains 1.0 to 2 ppm of fluorine on its surface, and in the case of an underground sewage the undesirable content will amount to 3.0 to 10.0 ppm or even more. In such cases the known methods, such as precipitation, filtration, pasteurization, are ineffective for removing fluorine from the water, and consequently, the water remains unfit for a drinking water.

The present invention aims at solving the difficulties encountered by the known methods, and has for its object to provide an improved method for removing fluorine from water with the use of activated alumina.

According to one aspect of the present invention a method for removal of fluorine from water comprises putting aluminium sulfate or aluminium chloride and sodium aluminate into a treating water, and stirring the solution while adjusting the PH value thereof in the range of 6.6 to 6.9, and removing the aluminium fluorides produced, thereby reducing the fluorine content to 5 ppm or below.

According to a further aspect of the present invention a method for removal of fluorine ions from water comprises installing an anode of aluminium against a cathode of cupper or iron in a treating water, passing a d.c. current therethrough to ionize aluminium ions from said anode, adding aluminium sulfate or aluminium chloride and sodium aluminate to the treating water, and stirring the solution while adjusting the PH value thereof in the range of 6.0 to 7.0 to produce aluminium fluoride hydrates, and causing said aluminium fluoride hydrates to be adsorbed in flocks of aluminium hydroxides.

According to a still further aspect of the present invention a method for removal of fluorine ions from water, comprises putting polyaluminium chloride and sodium aluminate into a treating water, stirring the solution while adjusting the PH value thereof in the range of 6.5 to 6.8, adding one part of polyaluminium chloride and ⅓ part of sodium aluminate to the solution while maintaining the PH value in the same range to produce aluminium fluoride, and causing the aluminium fluoride to be adsorbed in flocks of aluminium hydroxides.

In common with all the aspects of the present invention the fluorine content in water is effectively eliminated to the extent that the water becomes fit for drinking.

The present invention will be more particularly described by way of example, with reference to the drawing, in which.

In the first embodiment the fluorine ions are made to react with the aluminium ions ionized from aluminium salt, in the treating water obtained from a river or an underground sewage so as to produce aluminium fluoride hydrates separated in the water. Thus the fluorine ions can be readily removed together with the aluminium fluoride hydrates, in which a suitable high molecular aggregate agent is prefereably employed. To effect this process aluminium sulfate or aluminium chloride and sodium aluminate are added and mixed, where the amount of aluminium ions ionized from the aluminium salt critically affects the removal of fluorine ions.

Figure 1:
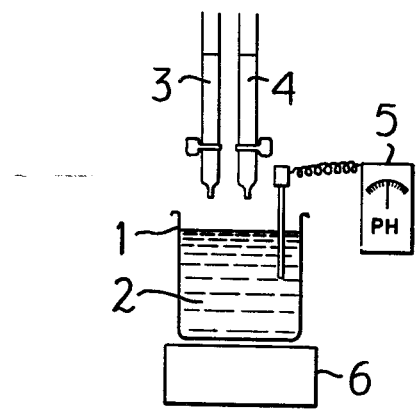
FIG. 1 is a schematic view of an apparatus for use in demonstrating a first embodiment of the present invention.

Referring to FIG. 1, a waste water 2 obtained from a factory is put into a 500 ml beaker 1, above which two burettes 3 and 4 are appropriately suspended, containing aluminium chloride (or aluminium sulfate) and sodium aluminate, respectively. The PH value is measured by means of a PH meter 5. The water 2 in the beaker 1 is mixed by means of a stirrer 6 while dropping each liquid from the burettes 3 and 4 by degrees. Through the PH meter 5 PH values are watched so as not to exceed the range of 6.6 to 6.9. In this way given amount of each liquid is simultaneously put and mixed. If the PH value exceeds this range the aluminium ions will become less reactive, thereby resulting in the reduced efficiency.

Figure 2:
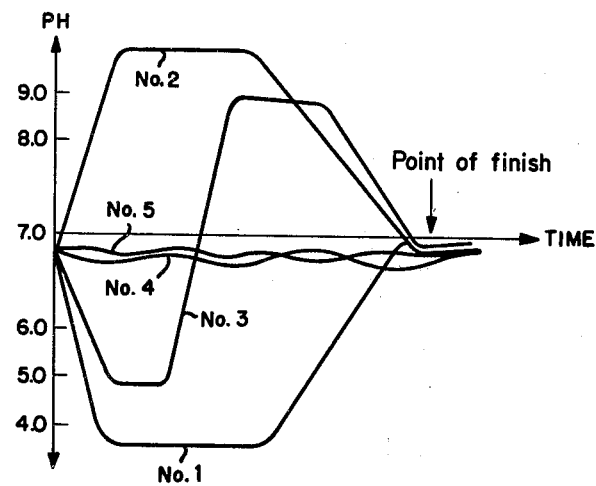
FIG. 2 is a graph depicting the changes of PH values in the treating water.

Table 1 shows the comparative data obtained from tests on different specimens. FIG. 2 indicates curves depicting the changes of PH values of each specimen.

TABLE I

| (*) Specimen | (A) Aluminium Chloride | (B) Sodium Aluminate | Adding Orger | Aggregate Agent (PPM) | Obtained PH | (**) F⁻ |
|---|---|---|---|---|---|---|
| No. 1 | 100 ppm | 210 ppm | (A) first, (B) second | 5 | 6.90 | 10.20 |
| 2 | 100 ppm | 210 ppm | (B) first, (A) second | 5 | 6.82 | 8.50 |
| 3 | 100 ppm | 210 ppm | ⅓ of (A) first, | | | |

TABLE I-continued

| (*) Specimen | (A) Aluminium Chloride | (B) Sodium Aluminate | Adding Orger | Aggregate Agent (PPM) | Obtained PH | (**) F⁻ |
|---|---|---|---|---|---|---|
| | | | (B) second, then ⅓ of (A) | 5 | 6.77 | 8.80 |
| 4 | 100 ppm | 210 ppm | (A) & (B) simultaneously | 5 | 6.88 | 5.10 |
| 5 | 100 ppm | 210 ppm | (A) & (B) simultaneously | 5 | 6.79 | 4.60 |

(*) Each specimen was obtained from the same factory, having 6.76 PH value and 26.1ppm of fluorine ions.
(**) F⁻ is the remaining fluorine ions in terms of ppm.

In adding the liquids (A) and (B) mentioned above to the specimen while watching the PH value thereof, it is desired that a dose of each agent is varied with the PH value, the acidity and the alkalinity of the treating water. In the present invention an adequate dose thereof was determined under the consideration of the desired PH value.

Figure 3:
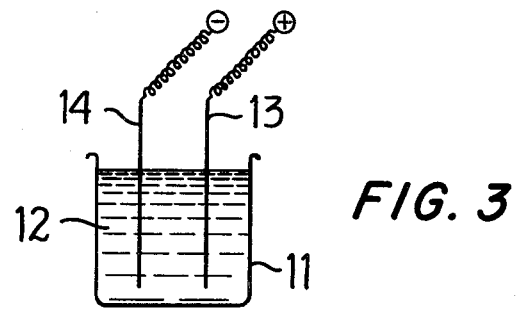
FIG. 3 is a schematic view of an apparatus for use in demonstrating a second embodiment of the present invention.

In the second preferred embodiment, referring to FIG. 3, a water 12 to be treated is contained in a 500 ml beaker 11, in which the anode 13 of aluminium and the cathode of cupper (or iron) are provided. Across the electrodes the voltage of 5 to 10 volts is applied to cause a 30 mA d.c. current. As a result hydrogen gas is generated from the cathode 14, and from the anode 13 aluminium ions are ionized while a small amount of oxygen gas is being generated therefrom. At this stage the PH value of the water is adjusted and maintained so as to fall in the range of 6.0 to 7.0, where the alminium ions can be reactive, thereby readily forming aluminium fluoride hydrates through a chemical reaction with the fluorine ions. The aluminium fluoride hydrates is insoluble in the water and disperses in the form of colloid, which is adsorbed by aluminium hydroxides additionally produced from the aluminium ions. Finally by removing the aluminium hydroxides from the water the fluorine ions contained therein are eliminated together therewith. In this way 60% to 90% of fluorine ions was removed, as indicated in Table 2. In order to ensure an excessive amount of aluminium ions against fluorine ions, aluminium sulfate or aluminium chloride and sodium aluminate are previously added by 30 to 200 ppm to the extent that the PH value of the drinking water amounts to 6.0 to 7.0. Normally as the electrolysis advances the PH value rises, and aluminium sulfate or aluminium chloride is accordingly added to adjust the PH value, thereby maintaining the efficient operation. In addition, this reduces the amount of aluminium ions ionized from the anode. But the added aluminium ions are less active, and reacts with only a small part of fluorine ions.

Table 3 indicates the comparative date obtained from the experiments in which the anode of aluminium or carbon is emplyoed against the cathode of cupper, so as to demonstrate that the aluminium ions ionized from the anode will be more effective than those from the added aluminium compound.

TABLE 2

| (*) Specimen | F⁻ before treatment | F⁻ after treatment | (Added agents) Aluminium sulfate | Sodium aluminates | (**) Assistant (Bentonite) |
|---|---|---|---|---|---|
| | (PPM) | (PPM) | | | |
| No. 11 | 26.1 | 9.6 | — | — | — |
| 12 | 26.1 | 6.8 | 200 + 50ppm | 30ppm | — |
| 13 | 26.1 | 2.9 | 200 + 50ppm | 30ppm | 100ppm |
| 14 | 2.88 | 1.21 | — | — | — |
| 15 | 2.88 | 0.66 | 50 + 20ppm | 10ppm | — |
| 16 | 2.88 | 0.28 | 50 + 20ppm | 10ppm | 50ppm |

(*) The specimens No. 11 to No. 13 were obtained from the same factory, and the specimen No. 14 to No. 16 were from the same well, which were available as a drinking water. With respect to the specimens No. 13 and 16 the treatment continued for 2 hours, and on the others it continued for one hour.
(**) The assitant agent was used to facilitate the aggregation of aluminium hydroxides, thereby strengthening the adsorbtive effect thereof upon aluminium fluoride hydrates. Thus the removal of fluorine ions proceeds efficiently. Alternatively diatomaceous earth can be used.

TABLE 3

| (*) Specimen | F⁻ before treatment | F⁻ after treatment | (**) Material of Anode | Aluminium sulfate | Sodium aluminium | Calcium carbonate |
|---|---|---|---|---|---|---|
| | (PPM) | (PPM) | | | | |
| No. 17 | 20.0 | 7.0 | Aluminium | — | — | — |
| 18 | 20.0 | 10.4 | Carbon | 200 + 50ppm | 20ppm | — |
| 19 | 20.0 | 17.8 | Carbon | — | — | — |
| 20 | 2.0 | 0.62 | Aluminium | 50 + 20ppm | 8ppm | — |
| 21 | 2.0 | 1.78 | Carbon | — | — | — |
| 22 | 2.0 | 1.94 | Carbon | — | — | 20ppm |

(*) Each specimen was prepared by putting sodium fluoride in a purified water by equivalent weight.
(**) The cathode was made of copper.

The specimens No. 17 to 19 were electrolysed by a 50 mA current for 50 minutes, and the specimens No. 20 to 22 were electrolysed by a 20 mA current for 2 hours.

The dissociation of aluminium ions from the anode can be controlled by adjusting the flow of current, which is done, for example, by rotating a knob. This prevents the waste of electricity, thereby leading to the economy on the operation of treatment.Since no addition of calcium is required, the cathode is made safe from a possible formation of scale. The aluminium ions ionized from the anode is active enough to combine with hydroxyl radicals, thereby promoting the formation of aluminium hydroxides, which, as described above, adsorb the fluorine ions in the water.

Figure 4:
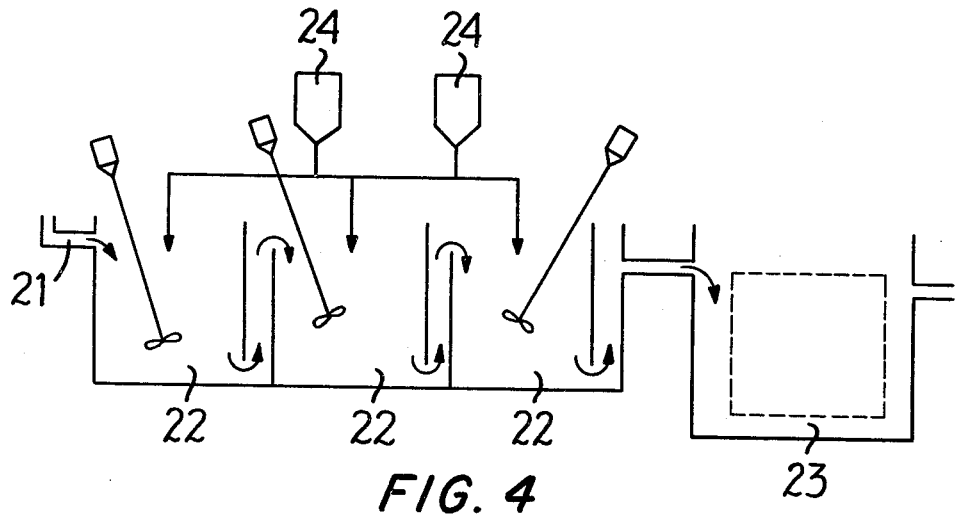
FIG. 4 is a schematic view of an apparatus for use in demonstrating a third embodiment of the present invention.

Referring to FIG. 4, the third preferred embodiment will be described. The water to be treated is flown into a tank 22 through an inlet passage 21, where the water is stirred by means of stirrers, with the addition of polyaluminium chloride and sodium aluminates, which are supplied from respective containers 24. The fluorine ions in the water combine with the aluminium ions ionized from the added agents, thereby forming aluminium fluorides in a colloidal state. In this case the aluminium ions are mostly exhaused in forming aluminium hydroxides, and accordingly, it is required to provide aluminium ions in excess so as to secure an adequate amount for the fluorine ions. The colloidal aluminium fluorides are adsorbed by the aluminium hydroxides existing around the former, and the adsorbed body is led into a settling tank 23. In this way the fluorine content in the water is removed together with a sludge taken out of the settling tank.

Table 4 shows the data obtained from the demonstrations employing the apparatus mentioned above, in which the treatment was divided into three processes, as shown in FIG. 4. These processes will be referred to as the first chamber, the second chamber, and the third chamber.

In the first chamber a given amount of polyaluminium chloride and sodium aluminate were simultaneously poured in the treating water, and the PH value thereof was adjusted to 6.5 to 6.8. During the passing of the water from the first chamber to the third chamber via the second chamber polyaluminium chloride and sodium aluminate were added by 3 parts to 1 part while maintaining the PH value to 6.5 to 6.8. In this way the water was made suitable for drinking.

TABLE 4

| (*) Specimen | Added agents | First chamber amount | PH | Second chamber amount | PH | Third chamber amount | PH | Treated water PH | F⁻ |
|---|---|---|---|---|---|---|---|---|---|
| No. 31 | Polyaluminium chloride | 200ppm | 6.60 | 50ppm | 6.67 | 50ppm | 6.70 | 6.78 | 0.50 |
| | Sodium aluminate | 50ppm | | 15ppm | | 15ppm | | | |
| 32 | Polyaluminium chloride | 200ppm | 6.60 | 100ppm | 6.72 | 100ppm | 6.63 | 6.75 | 0.39 |
| | Sodium aluminate | 50ppm | | 30ppm | | 35ppm | | | |
| 33 | Polyaluminium chloride | 300ppm | 4.14 | 100ppm | 5.21 | 100ppm | 6.55 | 6.68 | 0.88 |
| | Sodium aluminate | 0ppm | | 50ppm | | 100ppm | | | |

(*) The specimens were obtained from the surficial water of a river, having 7.86PH and 1.23ppm of fluorine ion.

It is known in the art to use polyaluminium chloride as an aggregate agent. But to remove fluorine it is required to raise the concentration of aluminium ions in the treating liquid. If fluorine ions are to be removed by a single use of polyaluminium chloride as shown by the demonstration on Specimen No. 33 in Table 4 (see the column for First chamber), the PH value will lower even with the increase in the amount of polyaluminium chloride, and fail to maintain the required range of 6.5 to 6.8. This unfavourably affects the subsequent treatments in the second and third chamber, thereby only resulting in a barely safe limit of fluorine standard as a drinking water.

Table 5 shows the data obtained from the experiments with respect to two types of specimens, the No. 34 being obtained from a deep well and No. 35 being from the underground water, each having 7.52 PH and 4.40 ppm of fluorine.

TABLE 5

| Specimen | Added agents | First chamber amount | PH | Second chamber amount | PH | Third chamber amount | PH | Treated water PH | F⁻ |
|---|---|---|---|---|---|---|---|---|---|
| No. 34 | Polyaluminium chloride | 600ppm | 6.65 | 100ppm | 6.71 | 100ppm | 6.66 | 6.81 | 0.46 |
| | Sodium aluminate | 180ppm | | 30ppm | | 30ppm | | | |
| 35 | Polyaluminium chloride | 300ppm | 7.88 | 30ppm | 7.68 | 30ppm | 7.55 | 7.80 | 2.26 |
| | Sodium aluminate | 120ppm | | 10ppm | | 10ppm | | | |

During the treatment of the specimen No. 34 the PH value was maintained in the range of 6.5 to 6.8, which, as mentioned above, is required to secure a constant reactive power of aluminium ions. On the contrary, the PH value of the specimen No. 35 was not controlled, thereby causing it to rise above the desired limit. As a result, this specimen remained unfit for a drinking water.

What is claimed is:

1. A method of removing fluorine ions from water, which comprises:
   (a) adding a material selected from the group consisting of aluminium sulfate and aluminium chloride to said water in an amount effective to produce precipitation of said fluorine ions as aluminium fluoride hydrates simultaneously with sodium aluminate in a ratio effective to establish and to continuously maintain the PH value of the solution in the range of 6.6 to 6.9, (b) continuously stirring the mixture and reacting the aluminium ions and fluorine ions in said water with each other to produce said aluminium fluoride hydrates insoluble in said water, (c) removing said aluminium fluoride hydrates from said water.

2. A method of removing fluorine ions from water, which comprises:

(a) installing an aluminium anode and a cathode in said water, (b) passing a d.c. current thrugh said electrodes to ionize aluminium ions from said anode, (c) adding a material selected from the group consisting of aluminium sulfate and aluminium chloride to said water in an amount effective to produce a precipitation of said fluorine ions as aluminium fluoride hydrates, simultaneously with sodium aluminate ina ratio effective to establish and to continuously maintain the PH valueof said solution in the range of 6.0 to 7.0, (d) reacting the aluminium ions and fluorine ions in said water to form said aluminum hydrates and flocks of aluminum hydroxide (f) adsorbing said aluminium fluoride hydrates in said flocks of aluminium fluorides, (f) removing said flocks of aluminium hydroxides containing said adsorbed aluminium fluoride hydrates from said water.

3. A method of removing fluorine ions from water, which comprises:

(a) adding polyaluminium chloride to said water in an amount effective to produce precipitation of said fluorine ions as aluminium fluoride hydrates simultaneously with sodium aluminate in a ratio effective to establish the PH value of the solution in the range of 6.5 to 6.8, (b) continuously stirring said solution, (c) adding polyaluminium chloride and sodium aluminate in a ratio of 3:1 to said solution in an amount effective to maintain the PH value in said range, (d) reacting the aluminium ions and fluorine ions in said water to form said aluminum fluoride hydrates and flocks of aluminum hydroxide, (e) adsorbing said aluminium fluoride hydrates in said flocks of aluminium hydroxides, (f) removing said flocks of aluminium hydroxides containing adsorbed fluorine ions from said water, said flocks of aluminium hydroxides being in the form of sludge.

* * * * *